(12) United States Patent
Wagener et al.

(10) Patent No.: US 7,601,013 B2
(45) Date of Patent: Oct. 13, 2009

(54) CONNECTION OR DEVICE ADAPTER

(75) Inventors: Hans Wagener, Dietzhölztal (DE); Dirk Hecker, Dillenburg (DE); Ulrich Haubach, Greifenstein (DE)

(73) Assignee: Rittal GmbH & Co. KG, Herborn (DE)

( * ) Notice: Subject to any disclaimer, the term of this patent is extended or adjusted under 35 U.S.C. 154(b) by 39 days.

(21) Appl. No.: 11/793,186

(22) PCT Filed: Feb. 10, 2006

(86) PCT No.: PCT/EP2006/001254

§ 371 (c)(1),
(2), (4) Date: Jun. 14, 2007

(87) PCT Pub. No.: WO2006/094598

PCT Pub. Date: Sep. 14, 2006

(65) Prior Publication Data

US 2008/0220635 A1    Sep. 11, 2008

(30) Foreign Application Priority Data

Mar. 4, 2005    (DE) .................... 10 2005 009 856

(51) Int. Cl.
*H01R 25/00* (2006.01)
(52) U.S. Cl. .................... 439/110; 439/116
(58) Field of Classification Search .............. 439/110, 439/113, 114, 121, 207, 532, 116
See application file for complete search history.

(56) References Cited

U.S. PATENT DOCUMENTS 5,779,504 A * 7/1998 Dominiak et al. .......... 439/709
6,086,389 A   7/2000 Wagener
6,164,988 A * 12/2000 Wagener .................... 439/110
6,767,223 B2 * 7/2004 Lostoski et al. ........... 439/76.1
7,244,143 B2 * 7/2007 Wagener .................... 439/532
7,448,885 B2 * 11/2008 Wagener .................... 439/116

FOREIGN PATENT DOCUMENTS

| DE | 41 24 487 A1 | 7/1992 |
| DE | 197 55 848 A1 | 6/1999 |
| DE | 200 21 418 U1 | 5/2001 |
| DE | 100 61 940 A1 | 7/2002 |
| DE | 102 15 500 A1 | 10/2003 |
| DE | 103 00 723 A1 | 7/2004 |

* cited by examiner

*Primary Examiner*—Tho D Ta
(74) *Attorney, Agent, or Firm*—Pauley Petersen & Erickson

(57) ABSTRACT

A connection or device adapter, which can be placed on a mounting unit at right angles with respect to a longitudinal direction of busbars and mechanically connected, one contact element being electrically conductively connected to the facing busbar in a connection or device adapter per busbar and the contact elements in the connection or device adapter being led up to connection receptacles in the region of a narrow side of the connection or device adapter. If the contact elements are formed as contact bars and are electrically conductively connected to one another by the associated connection receptacles and form connection units and for the connection or device adapter to have receptacles for the connection units in the region of a narrow side and to accommodate the contact elements with contact points positioned in relation to the busbars, the complexity in terms of parts and assembly, in particular for the connection or device adapter, is substantially reduced and simplified.

23 Claims, 6 Drawing Sheets

CONNECTION OR DEVICE ADAPTER

BACKGROUND OF THE INVENTION

1. Field of the Invention

This invention relates to a connector or device adapter, which can be placed on a mounting unit perpendicularly with respect to the longitudinal direction of bus bars and can be mechanically connected, wherein one contact element in the connector or device adapter per bus bar is in an electrically conducting connection with the facing bus bar, and in the connector or device adapter the contact elements are conducted to connecting receptacles in the area of a narrow side of the connector or device adapter.

2. Discussion of Related Art

A device or connector adapter in connection with a bus bar system is known from German Patent Reference DE 103 00 723 A1. In this case, the bus bar system, together with the mounting units and the connector or device adapter, are designed as a three phase system. The installation of the contact elements in the connector or device adapter and their connection with the connecting receptacles in the area of the narrow sides of the connector or device adapter require a considerable assembly and parts cost outlay.

SUMMARY OF THE INVENTION

It is one object of this invention to provide a device or connector adapter of the type mentioned above but in which the assembly and parts cost outlay for the connector or device adapter is substantially reduced, and wherein new variation possibilities for its layout are provided.

In accordance with this invention, the above object is attained with contact elements embodied as contact rails connected in an electrically conducting manner with the associated connection receptacles and that form connecting units. The connector or device adapter has receptacles for the connecting units in the area of a narrow side and receives the contact elements with the contact points positioned with respect to the bus bars.

The connecting units include a contact rail and a connecting receptacle that can be prefabricated without a large cost outlay for parts and assembly and can be simply connected with the connector or the device adapter. The connection receptacles contain all electrical parts providing the connection with the contact rail and provide the connecting possibility for lines, plugs or the like.

In one embodiment favorable for the production and mounting, the contact rails with the associated connection receptacles are fixed in place in insulating connection blocks, and the connecting units are fixed in place in the receptacles designed as connection receptacles.

In one embodiment, three connecting units with contact elements of different lengths, matched to the spaced-apart bus bars, are used in a three-phase connector or device adapter, only the length of the connecting contacts at the three required connecting units is changed. The remaining structure and the connection of the parts with the connecting units, however, remains the same. In this case, the assembly can be easily achieved if the electrical components can be fixed in place and brought into electrical connection with each other while producing the connection blocks with a plastic injection molding process.

The connection receptacles are arranged at a narrow side of the connector or device adapter and can be embodied as individual receptacles for the connection blocks. In this case, the connection of the connection units with the connector or device adapter can be simplified if the individual receptacles are embodied as snap-in receptacles for the connection blocks.

In another embodiment, the snap-in receptacles accept connection blocks of different widths with contact elements of different widths, wherein the width is oriented parallel with respect to the longitudinal direction of the bus bars. Thus, it is possible to lay out the insulating housing of the connector or device adapter for different current intensities, in case connecting units with different contact elements are employed.

In accordance with one embodiment, the reception of the contact elements in the connector or device adapter, and the electrical contacting with the bus bars is solved because on an underside facing the mounting unit, the connector or device adapter is divided into bus bar receptacles by separating walls. The contact elements are received in longitudinal grooves on the top or on an intermediate wall of the connector or device adapter and protrude with bow-like contact points formed on their ends through openings into the bus bar receptacles and the contact elements are covered on the top by a cover plate. In that case, the top of the connector or device adapter can be utilized in its entirety for the further installation of devices and the like. Furthermore, the connection with the bus bar receivers on the underside of the connector or device adapter exist only for the contact points of the contact elements, and thus with the bus bars of the mounting unit.

In accordance with one embodiment, the covering of the contact elements is designed so that the connector or device adapter has longitudinal edge elements projecting beyond its top, which forms a reception trough for the contact elements, and the cover plate is snapped into this reception trough. These longitudinal edge elements can have fastening receivers for the installation of devices because they have the required stability on the connector or the device adapter.

So that the contact points of the contact elements take up defined positions in the connector or device adapter, following the contact points, the contact elements can bridge the openings by an end section and rest on the top or intermediate wall of the connector or device adapter.

If the connector or device adapter only has one connection receptacle on the narrow side for a connection unit with a connection block and a contact element, the bus bar system can only be utilized with one phase, and the connector or device adapter is thus limited.

However, in another embodiment the connector or device adapter has a connection receptacle on the narrow side for a connection block with, for example, two or three contact elements. The multi-connecting unit thus formed takes the place of three connecting units, in which all three contact elements are fixed in place and are electrically connected with the associated connector receptacles.

The connection receptacles of the connecting units can be variously embodied. A mounting-friendly embodiment can have the connection receptacles of the connecting units embodied as screwless clamping connectors for individual connectors.

It is also possible, without a further mounting of connectors, for the connection receptacles to be designed as electrical plug-in receptacles for electrical plugs, which can have line connections for lines to be connected.

In a further embodiment, in which no connection block is required, the connector receptacle can be formed on a connector element where the other side is in firm electrical contact with the contact rail.

BRIEF DESCRIPTION OF THE DRAWINGS

This invention is explained in view of an exemplary embodiment represented in the drawings, wherein.

DETAILED DESCRIPTION OF THE INVENTION

Figure 1:
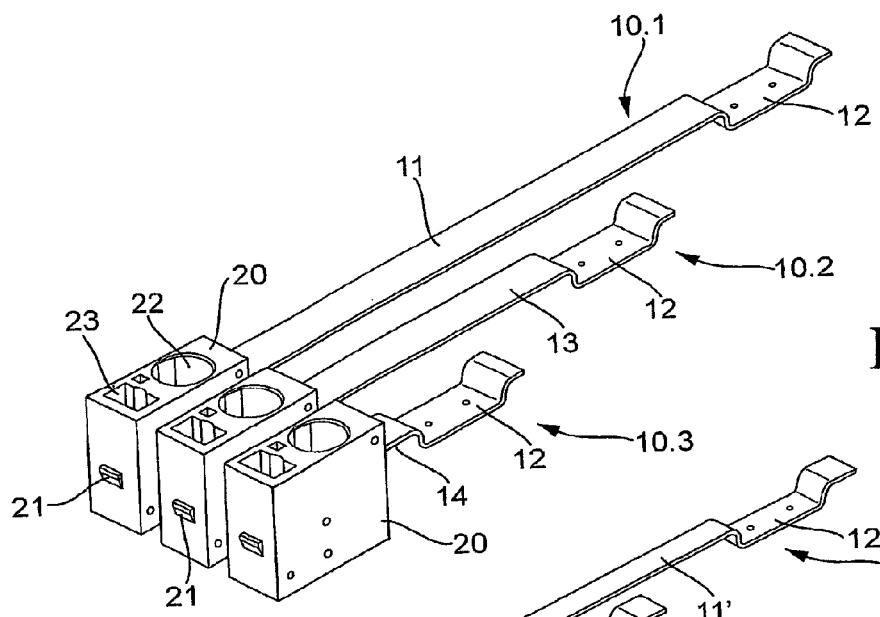
FIG. 1 shows three connector units for a three-phase connector or device adapter for high-intensity current in a perspective plan view.
Figure 4:
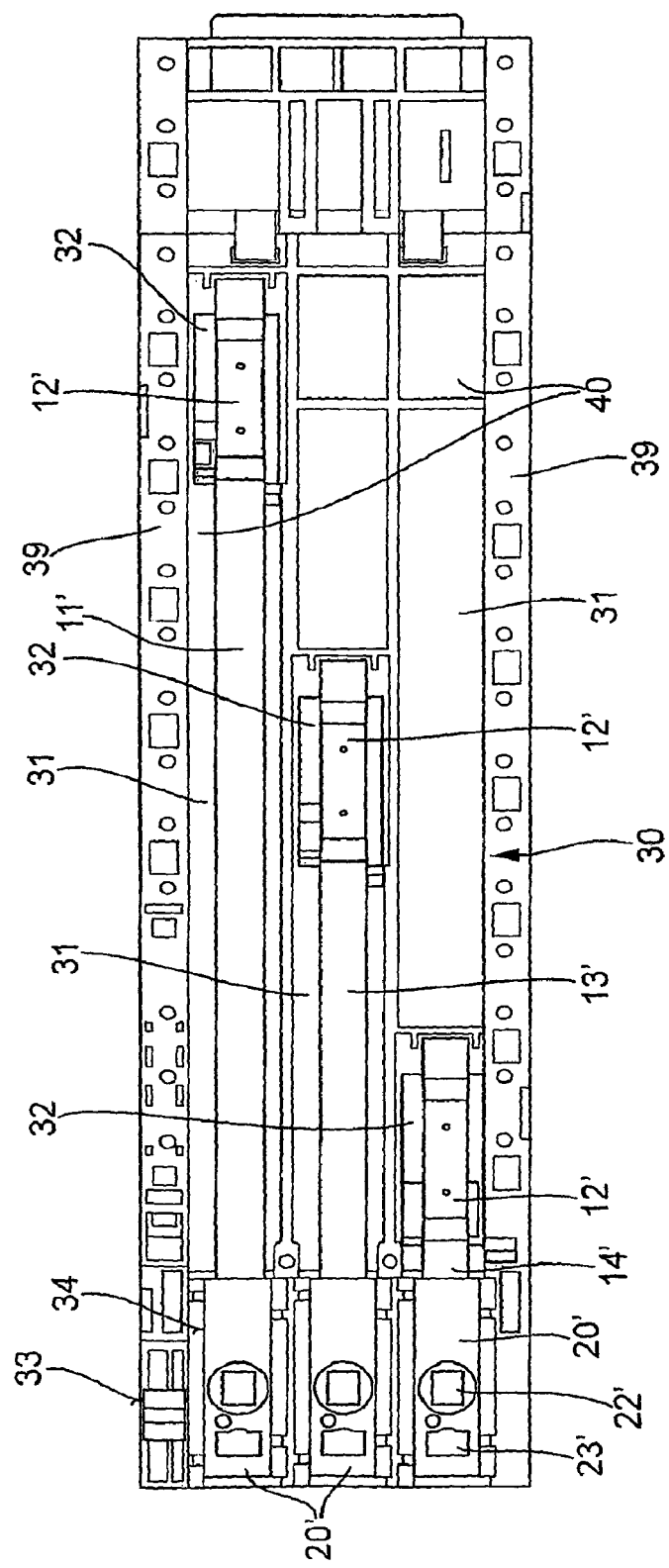
FIG. 4 shows a top view of a connector or device adapter with three inserted connecting units for a three-phase system.
Figure 5:
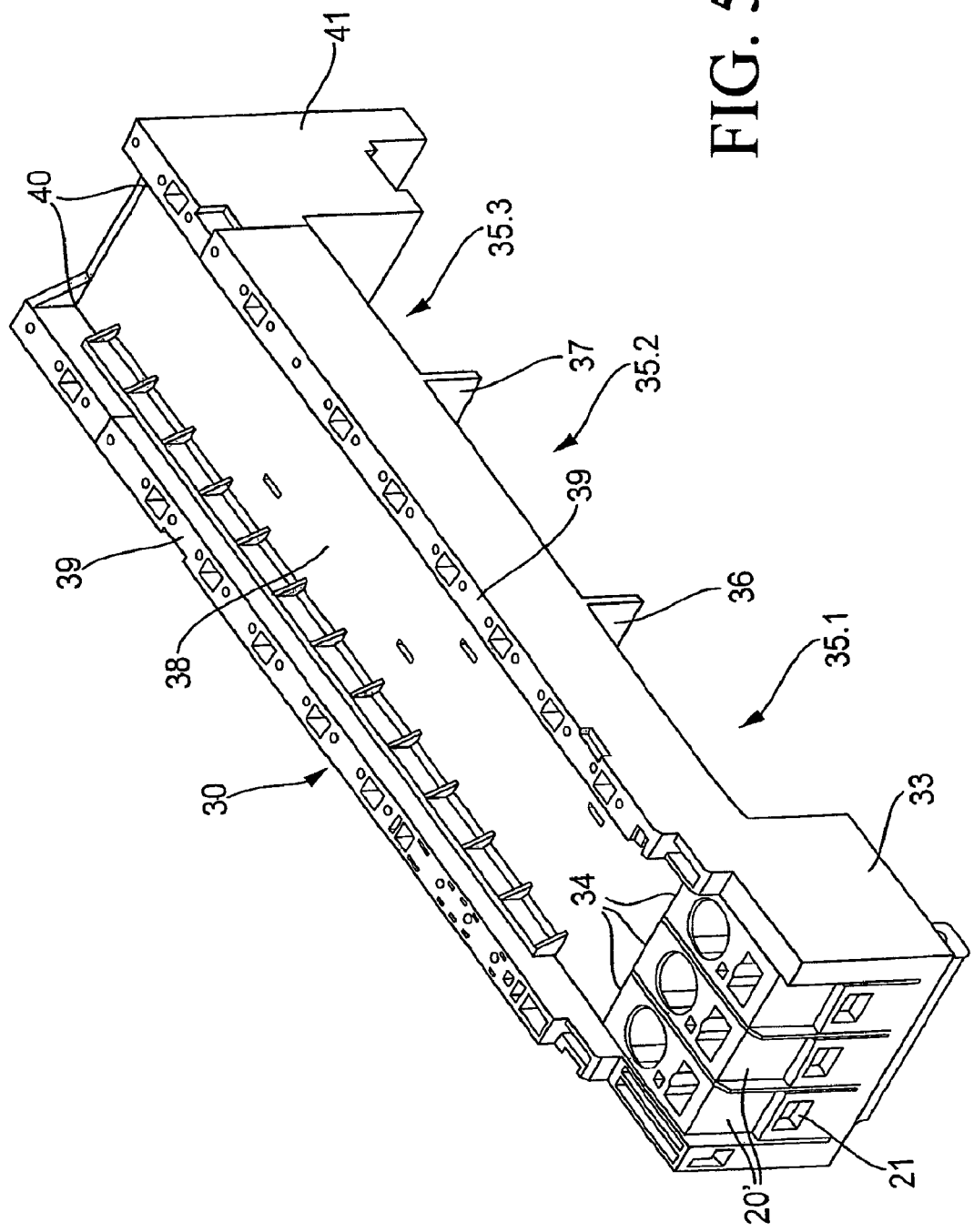
FIG. 5 shows a perspective view on an uncovered top of the connector or device adapter equipped with connecting units.
Figure 6:
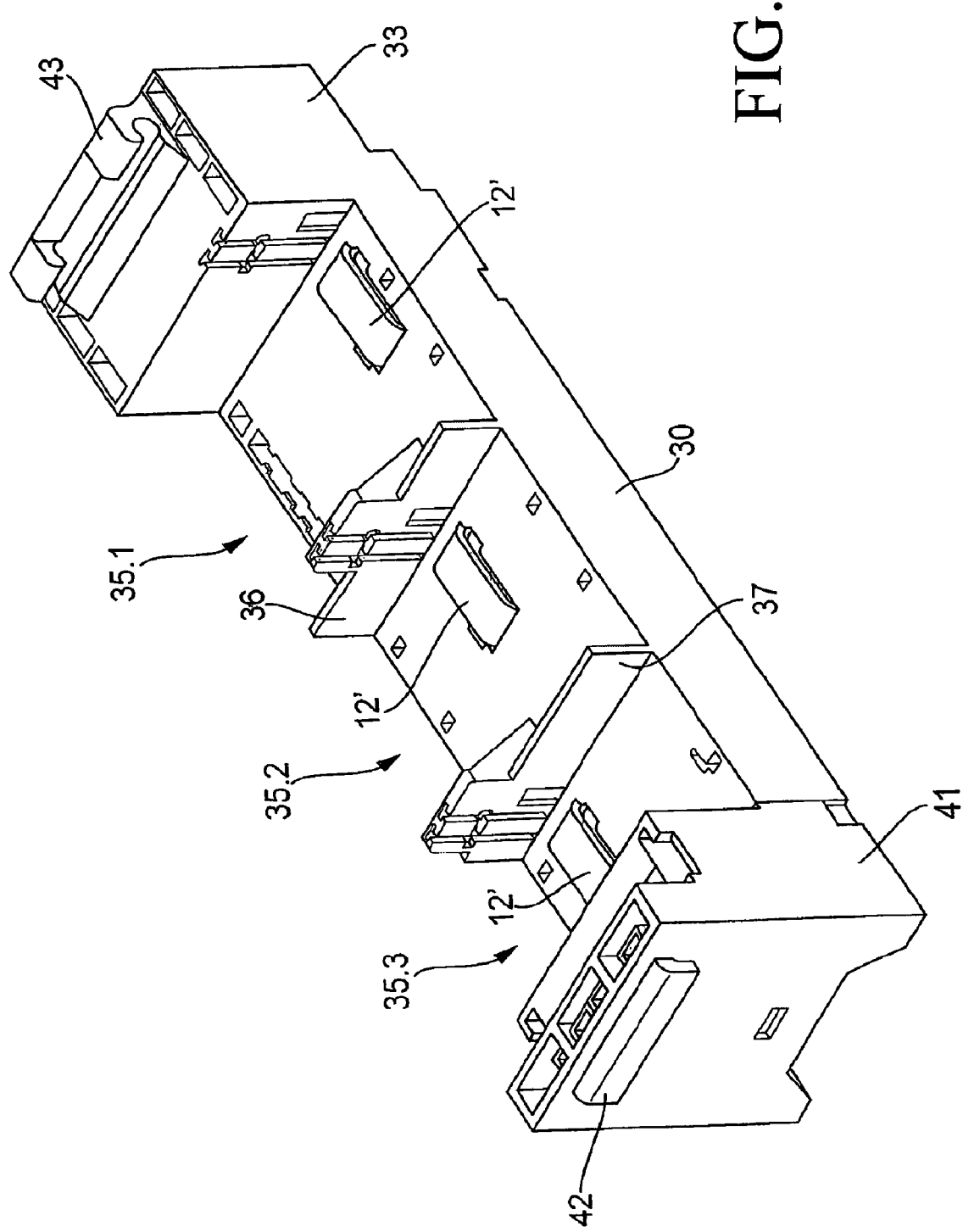
FIG. 6 shows a perspective view of the underside of the connector or device adapter with the bus bar receptacles and the contact points of the contact elements projecting into these.

Three connector units 10.1, 10.2 and 10.3 are shown in a perspective view in FIG. 1, which are employed for a connector or device adapter 30 in accordance with FIGS. 4 to 6, when for all three phases of the bus bar system it is brought into contact with a mounting unit for three spaced-apart bus bars.

The connecting units 10.1, 10.2 and 10.3 can be prefabricated and respectively comprise a connection block 20 with connection receptacles 22 and 23, produced by a plastic injection molding process, wherein the contact elements 11, 13 and 14, embodied as spring-elastic contact rails, as well as the contacting elements, are introduced into the connection receptacles 22 and 23 by injection molding, are simultaneously fixed in place and electrically connected with each other. FIG. 3C shows the fixation in place of a contact rail 11 in the associated connection block 20 by a U-shaped section 11.1. Instead of allocating a contact rail 11, 13, 14 to a respective connection block 20, in an alternative embodiment the contact rails 11, 13, 14 are bound together in a common combined connection block with connection receptacles 22, 23 associated with the contact rails.

Figure 2:
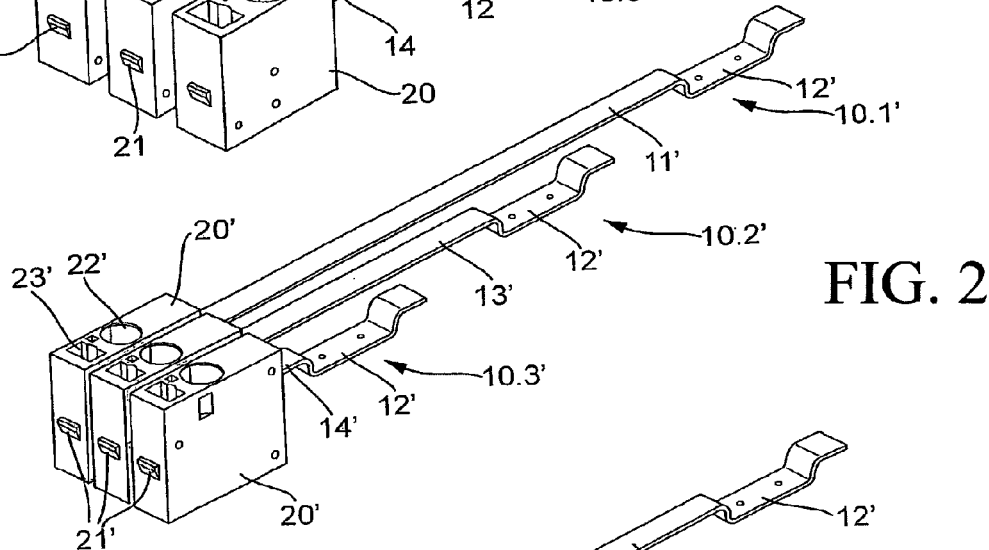
FIG. 2 shows a perspective plan view of three connector units with contact elements for low-intensity current.

As FIGS. 4 to 6 show, on one narrow side of the housing made of an insulating material, the connector or device adapter 30 has a neck 33, into which connector receptacles 34 are placed, which are designed as single receptacles. The connecting units 10.1, 10.2 and 10.3, or 10.1', 10.2' or 10.3' can be snapped from the top of the connector or device adapter 30 into the connector receptacles 34 which have, for example, a shaft-like guidance device. For this purpose, the connection blocks 20 or 20' have snap-in elements 21 formed on the front face, which snap into snap-in receptacles of the neck 33, as shown in FIG. 5. In this case, the connector receptacles 34 can have a width and can be divided by intermediate walls so that the widest connection blocks 20 in accordance with FIG. 1 can be accommodated. However, narrower connection blocks 20' in accordance with FIG. 2, which also support narrower contact elements 11', 13' and 14' embodied as contact rails, can also be snapped into the connector receptacles 34. The length of the contact elements 11', 13' and 14' of the connecting units 10.1', 10.2' and 10.3' in accordance with FIG. 2 corresponds to the length of the contact elements 11, 13 and 14 of the connecting units 10.1, 10.2 and 10.3 in accordance with FIG. 1.

FIG. 4 shows that three longitudinal grooves 31 are cut, spaced apart from each other, into the top of the connector or device adapter 30, with a width matched to the largest width of contact elements 11, 13 and 14, so that they can also receive the narrower contact elements 11', 13' and 14'. The top of the connector or device adapter is closed by taller longitudinal edge elements 39 (FIG. 5), which delimit a reception trough 40. If the connecting units 10.1 to 10.3, or 10.1' to 10.3' are snapped into the connector or device adapter 30, the contact elements 11, 13 and 14, or 11', 13' and 14' can be covered on the top by a cover plate 38. In this case, the cover plate 38 can be snapped into the reception trough 40. The longitudinal edge elements 39 of the connector or device adapter 30 have fastening receptacles, so that fastening retainers, devices and the like can be fastened on the top of the connector or device adapter 30.

The contact elements 11, 13 and 14, or 11', 13' and 14' of the connecting units 10.1. 10.2 and 10.3, or 10.1', 10.2' and 10.3' are of different lengths and terminate at the free ends into contact points 12 or 12'. The contact points 12 or 12' are embodied bow-like and project through openings 32 in the connector or device adapter 30 in bus bar receptacles 35.1, 35.2 and 35.3 on the underside of the connector or device adapter 30, which faces the mounting unit with the bus bars. The lengths of the contact elements 11, 13, 14, or 11', 13', 14' and the spacing between the openings 35.1, 35.2, 35.3 in the connector or device adapter 30 are matched to the spacing between the bus bars in the mounting unit. The contact points 12 or 12' slightly project into the bus bar receptacles 35.1, 35.2 and 35.3, so that they can come resiliently into electrical contact with the bus bars as soon as the connector or device adapter 30 is mechanically connected with the mounting unit. This mechanical connection can be achieved by snap-in elements and/or other connecting elements, such as indicated by the elements 42 and 43 (FIG. 6) on the connector or device adapter 30. The mounting unit has the corresponding counter-connecting and/or snap-in elements.

The contact elements 11, 13 and 14, or 11', 13' and 14', embodied as contact rails terminate in end sections at the free end at the connection with the contact points 12 or 12' which, after the openings 32, are supported on the top of the reception trough 40 of the connector or device adapter 30, as shown in FIG. 4.

The connector or device adapter 40 can also be used for a single-phase system. In that case, only one connector receptacle 34 is provided on the neck 33, into which a connecting unit 10.1. 10.2, 10.3, 10.1', 10.2' or 10.3' can be inserted or snapped. With the selection of the connecting unit it is possible to determine with which bus bar of the mounting unit the connector or device adapter is connected and placed into contact in the single-phase system.

Figure 3A:
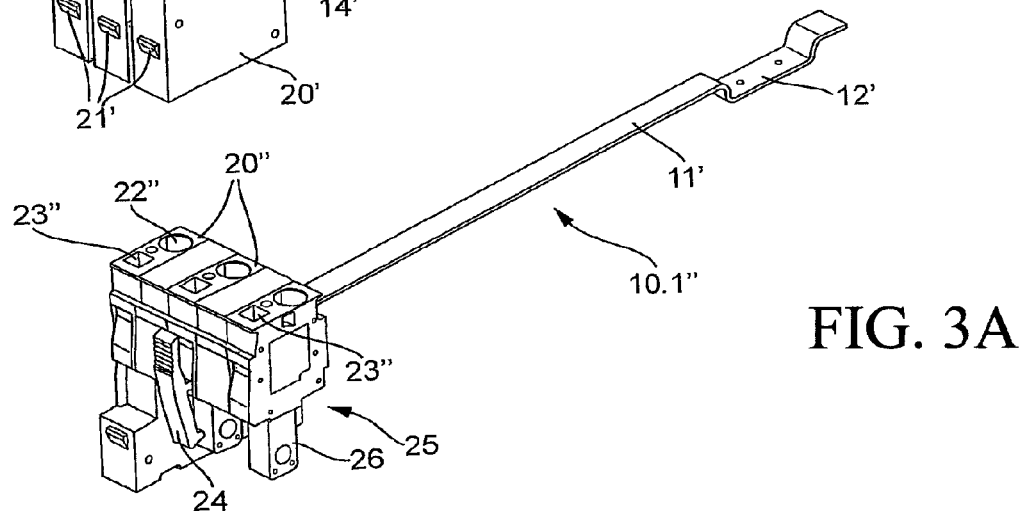
FIG. 3A shows a perspective plan view of a modified connecting unit for a single-phase connection of the connector or device adapter, and with a plug.

As FIG. 3A shows, the connecting unit in the form of a one-phase connecting unit can have only one contact element 11" or, in the form of a multi-phase connecting unit, three elements of different length. The connection receptacles 22" and 23" are correspondingly provided and distributed once or three times.

Figure 3B:
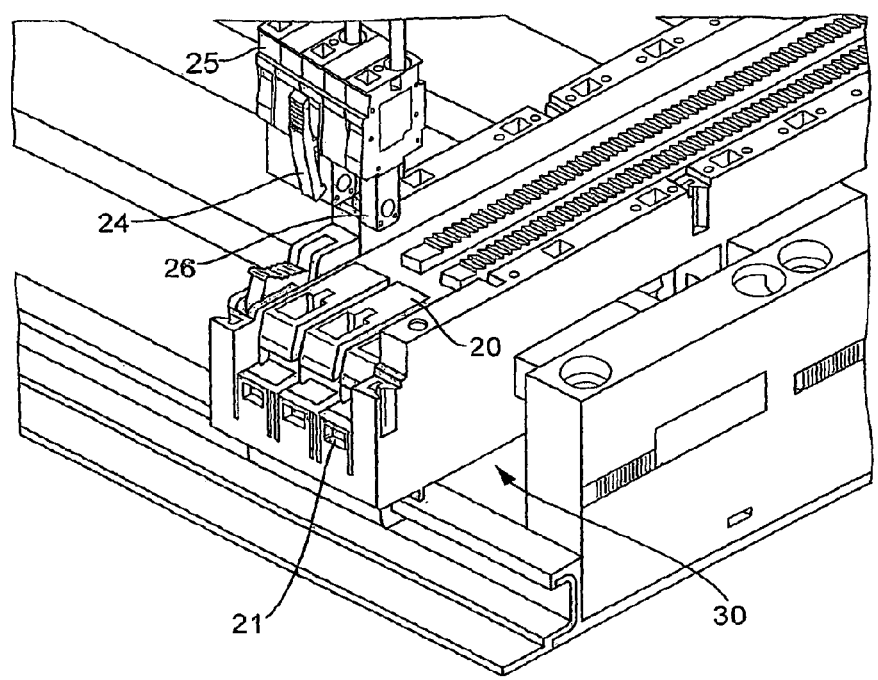
FIG. 3B shows a partial perspective view of a device adapter attached to a mounting unit, with a connecting unit in accordance with FIG. 3A, with the plug removed.
Figure 3C:
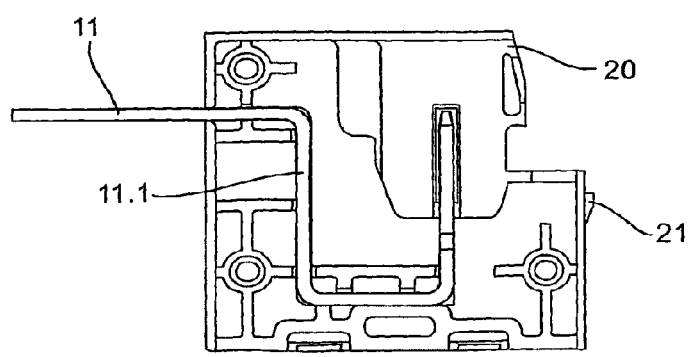
FIG. 3C shows a section view taken through a connection block with a contact rail formed in it.

FIG. 3A shows a plug 25, which is plugged with a prong 26 into the connection receptacles 23 or 23' and makes contact therein, and which has connection receptacles 22", 23", with which connecting lines can either be connected from the outset, or can be brought into contact in a way similar to the one in the connection receptacles 22, 23, or 22', 23'. The connecting lines can be easily removed together from the connection blocks 20, 20', and thus from the connecting units, by the plug 25. A snap-in lever 24 with a snap-in protrusion, which by a prestressed spring, snaps into a depression on the front face of the adapter housing, for example a snap-in receiver 21, is provided for fixing the plug 25 in place. In a perspective view, FIG. 3B shows a device adapter 30 with inserted connecting units attached to a mounting unit of a bus bar system, as well as with a removed plug, which can be inserted into the respective connection receptacles 23 of the connection blocks 20 and itself has connecting cables.

Figures 7, 8:
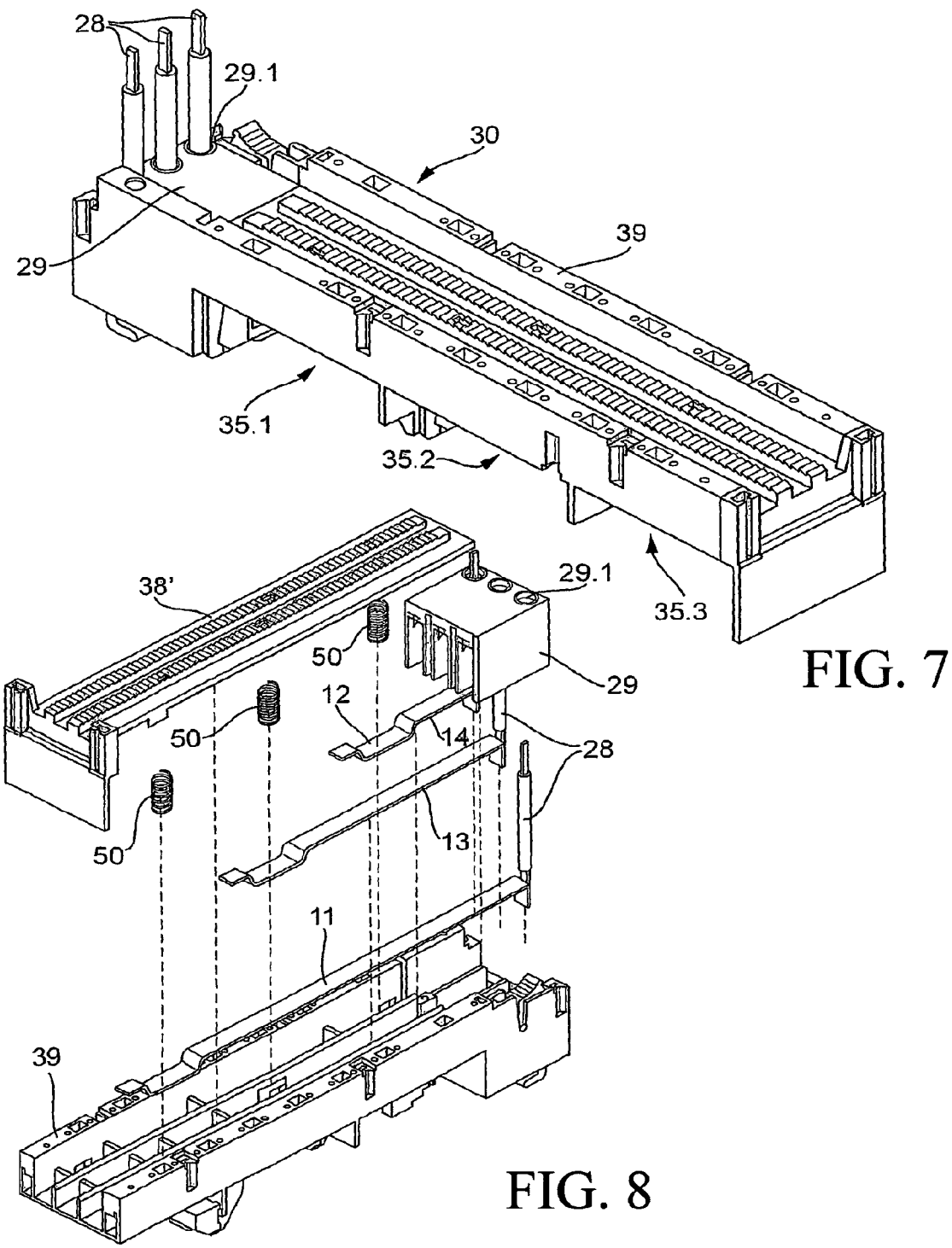
FIG. 7 shows a perspective view of a device adapter with a connecting unit in accordance with a further embodiment.
FIG. 8 shows the device adapter in accordance with FIG. 1, in a perspective exploded view.

FIG. 7 shows a device adapter 30 with an alternative embodiment of a connecting unit, of which only the connection receptacles embodied on the connecting elements 28 are shown. The connecting elements 28, with oppositely located end sections are put into electrical contact with beveled surface areas of the contact rails 13 and 14, as shown in FIG. 8, are conducted outward perpendicularly in relation to the top of the device adapter 30, through passages 29.1 of an insertion element 29 inserted at the narrow side of the adapter in the area of or near the connection receptacles 34. A connection between the connecting elements 28 and the contact rails can be provided by welding, such as ultrasonic welding, or by soldering. Connecting lines can be attached, for example by binding posts, to the connection receptacles of the connecting elements 28.

As FIG. 8 shows, the insertion element 29 is hollowed out on the underside and has clamps, in which the contact areas between the connecting elements 28 and the contact rails 11, 13, 14 are received. The insertion elements 29 are fixed in place on the adapter housing by being snapped in, for example, or are inserted and maintained in place by the cover plate 38' which, in turn, is snapped together with the upper edges of the adapter housing and extends over protrusions of the insertion element 29. FIG. 8 shows that the contact rails are advantageously supported on the top of their contact points 12, 12' by helical springs 50 against the underside of the cover plate 38' in order to generate a dependable contact pressure on the associated bus bars.

The invention claimed is:

1. A connector or device adapter, which can be placed on a mounting unit perpendicularly with respect to a longitudinal direction of bus bars in the mounting unit and can be mechanically connected thereto, wherein one contact element per bus bar in the connector or device adapter is in an electrically conducting connection with the bus bar, and in the connector or device adapter the contact elements are electrically conducted to connection receptacles (22, 23, 22', 23', 22", 23") near a narrow side of the connector or device adapter, the connector or device adapter comprising:

the contact elements formed as contact rails (11, 13, 14, 11', 13', 14') connected in an electrically conducting manner with the associated connection receptacles (22, 23, 22', 23', 22", 23", 28.1) and forming connecting units (10.1. 10.2, 10.3, 10.1', 10.2', 10.3', 10.1"), the contact elements including contact points at free ends and positioned with respect to the bus bars in the mounting unit, and the connector or device adapter (30) having receptacles (34) for receiving the connecting units (10.1. 10.2, 10.3, 10.1', 10.2', 10.3', 10.1") near the narrow side of the connector or device adapter, wherein three of the connecting units (10.1. 10.2, 10.3, 10.1', 10.2', 10.3', 10") with contact elements of different lengths, matched to spaced-apart bus bars, are in a three-phase type of the connector or device adapter (30).

2. The adapter in accordance with claim 1, wherein the adapter (30) has one connection receptacle (34) on the narrow side for a connection unit (10.1, 10.1') with a connection block (20, 20') and a contact element (11').

3. The adapter in accordance with claim 1, wherein the connector receptacle (28.1) is formed on a connector element (28) having an other side in firm electrical contact with the contact rail (11, 13, 14, 11', 13', 14').

4. The adapter in accordance with claim 1, wherein the contact rails (11, 13, 14, 11', 13', 14') with the associated connection receptacles (22, 23, 22', 23', 22", 23") are fixed in place in insulating connection blocks (20, 20', 20") and the connecting units (10.1. 10.2, 10.3, 10.1', 10.2', 10.3', 10.1") are fixed in place in the receptacles (34) formed as connection receptacles.

5. The adapter in accordance with claim 4, wherein the connection receptacles (34) are arranged at the narrow side of the adapter (30) and are embodied as individual receptacles for a respective connection block (20, 20').

6. The adapter in accordance with claim 5, wherein the individual receptacles are embodied as snap-in receptacles for the connection blocks (20, 20').

7. The adapter in accordance with claim 6, wherein the snap-in receptacles accept connection blocks (20, 20') of different widths with contact elements (11, 13, 14, 11', 13', 14') of different widths, wherein the width is oriented parallel with respect to the longitudinal direction of the bus bars.

8. The adapter in accordance with claim 1, wherein on an underside facing the mounting unit, the adapter (30) is divided into bus bar receptacles (35.1, 35.2, 35.3) by separating walls (36, 37), the contact elements (11, 13, 14, 11', 13', 14') are received in longitudinal grooves on one of a top or an intermediate wall of the adapter (30) and protrude with bow-like contact points (12, 12') formed on their ends through openings (32) into the bus bar receptacles (35.1, 35.2, 35.3), and the contact elements (11, 13, 14, 11', 13', 14') are covered on the top by a cover plate (38, 38').

9. The adapter in accordance with claim 8, wherein the contact elements (11, 13, 14, 11', 13', 14') each is supported on the top by helical springs (50) against an underside of the cover plate (38).

10. The adapter in accordance with claim 8, wherein the adapter (30) has longitudinal edge elements (39) projecting beyond the top, which form a reception trough (40) for the contact elements (11, 13, 14, 11', 13', 14'), and the cover plate (38) is snapped into the reception trough (40).

11. The adapter in accordance with claim 8, wherein following the contact points (12, 12') the contact elements (11, 13, 14, 11', 13', 14') bridge the openings (32) by an end section and rest on one of the top and an intermediate wall of the adapter (30).

12. The adapter in accordance with claim 8, wherein the contact elements (11, 13, 14, 11', 13', 14') each is supported on the top by helical springs (50) against the underside of the cover plate (38).

13. The adapter in accordance with claim 12, wherein the adapter (30) has longitudinal edge elements (39) projecting beyond the top, which form a reception trough (40) for the contact elements (11, 13, 14, 11', 13', 14'), and the cover plate (38) is snapped into the reception trough (40).

14. The adapter in accordance with claim 13, wherein following the contact points (12, 12') the contact elements (11, 13, 14, 11', 13', 14') bridge the openings (32) by an end section and rest on one of the top and an intermediate wall of the adapter (30).

15. The adapter in accordance with claim 1, wherein the adapter (30) has a connection receptacle (34) on the narrow side for a connection block with three of the contact elements (11, 13, 14, 11', 13', 14').

16. The adapter in accordance with claim 15, wherein the connection receptacles (22, 23, 22', 23', 22", 23") of the connecting units (10.1. 10.2, 10.3, 10.1', 10.2', 10.3', 10.1") are screwless clamping connectors for individual connectors.

17. The adapter in accordance with claim 16, wherein the connection receptacles (22, 23, 22', 23', 22", 23") are designed as electrical plug-in receptacles for electrical plugs (25) which have line connections (22", 23") for lines to be connected.

18. A connector or device adapter. which can be placed on a mounting unit perpendicularly with respect to a longitudinal direction of bus bars in the mounting unit and can be mechanically connected thereto, wherein one contact element per bus bar in the connector or device adapter is in an electrically conducting connection with the bus bar, and in the connector or device adapter the contact elements are electrically conducted to connection receptacles (22, 23, 22', 23', 22", 23") near a narrow side of the connector or device adapter. the connector or device adapter comprising:

the contact elements formed as contact rails (11, 13, 14, 11', 13', 14') connected in an electrically conducting manner with the associated connection receptacles (22, 23, 22', 23', 22", 23", 28.1) and forming connecting units (10.1, 10.2, 10.3, 10.1', 10.2', 10.3', 10.1"), the contact elements including contact points at free ends and positioned with respect to the bus bars in the mounting unit, and the connector or device adapter (30) having receptacles (34) for receiving the connecting units (10.1, 10.2, 10.3, 10.1', 10.2', 10.3', 10.1") near the narrow side of the device adapter, wherein the receptacles (34) comprise snap-in receptacles that accept connection blocks (20, 20') of different widths with contact elements (11, 13, 14, 11', 13', 14') of different widths, wherein the width is oriented parallel with respect to the longitudinal direction of the bus bars.

19. The adapter in accordance with claim 18, wherein three of the connecting units (10.1. 10.2, 10.3, 10.1', 10.2', 10.3', 10") with contact elements of different lengths, matched to spaced-apart bus bars, are in a three-phase type of the adapter (30).

20. A connector or device adapter, which can be placed on a mounting unit perpendicularly with respect to a longitudinal direction of bus bars in the mounting unit and can be mechanically connected thereto, wherein one contact element per bus bar in the connector or device adapter is in an electrically conducting connection with the bus bar, and in the connector or device adapter the contact elements are electrically conducted to connection receptacles (22, 23, 22', 23', 22", 23') near a narrow side of the connector or device adapter, the connector or device adapter comprising:

the contact elements formed as contact rails (11, 13, 14, 11', 13', 14') connected in an electrically conducting manner with the associated connection receptacles (22, 23, 22', 23', 22", 23", 28.1) and forming connecting units (10.1. 10.2. 10.3, 10.1', 10.2', 10.3', 10.1"). the contact elements including contact points at free ends and positioned with respect to the bus bars in the mounting unit, wherein the connection receptacles (22,23,22', 23', 22", 23") of the connecting units (10.1, 10.2, 10.3, 10.1', 10.2', 10.3', 10.1") are screwless clamping connectors for individual connectors, and the connector or device adapter (30) having receptacles (34) for receiving the connecting units (10.1, 10.2, 10.3, 10.1', 10.2', 10.3', 10.1") near the narrow side of the connector or device adapter.

21. The adapter in accordance with claim 20, wherein tbree of the connecting units (10.1. 10.2, 10.3, 10.1', 10.2', 10.3', 10") with contact elements of different lengths, matched to spaced-apart bus bars, are in a three-phase type of the adapter (30).

22. The adapter in accordance with claim 20, wherein the connection receptacles (34) are arranged at the narrow side of the adapter (30) and are embodied as individual receptacles for a respective connection block (20, 20') of the contact element.

23. A connector or device adapter, which can be placed on a mounting unit perpendicularly with respect to a longitudinal direction of bus bars in the mounting unit and can be mechanically connected thereto, wherein one contact element per bus bar in the connector or device adapter is in an electrically conducting connection with the bus bar, and in the connector or device adapter the contact elements are electrically conducted to connection receptacles (22, 23, 22', 23', 22", 23") near a narrow side of the connector or device adapter, the connector or device adapter comprising:

the contact elements formed as contact rails (11, 13, 14, 11', 13', 14') connected in an electrically conducting manner with the associated connection receptacles (22, 23, 22', 23', 22", 23", 28.1) and forming connecting units (10.1, 10.2, 10.3, 10.1', 10.2', 10.3', 10.1"), the contact elements including contact points at free ends and positioned with respect to the bus bars in the mounting unit, wherein the connection receptacles (22, 23, 22', 23', 22", 23") are designed as electrical plug-in receptacles for electrical plugs (25) which have line connections (22", 23") for lines to be connected, and the connector or device adapter (30) having receptacles (34) for receiving the connecting units (10.1, 10.2, 10.3, 10.1', 10.2', 10.3', 10.1") near the narrow side of the connector or device adapter.

* * * * *